(12) United States Patent
Yagi et al.

(10) Patent No.: US 11,875,065 B2
(45) Date of Patent: Jan. 16, 2024

(54) CONTROL DEVICE

(71) Applicant: OMRON Corporation, Kyoto (JP)

(72) Inventors: Daisuke Yagi, Otsu (JP); Yusaku Kobayashi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 167 days.

(21) Appl. No.: 17/424,367

(22) PCT Filed: Jan. 29, 2020

(86) PCT No.: PCT/JP2020/003096
§ 371 (c)(1),
(2) Date: Jul. 20, 2021

(87) PCT Pub. No.: WO2020/166328
PCT Pub. Date: Aug. 20, 2020

(65) Prior Publication Data
US 2022/0365730 A1 Nov. 17, 2022

(30) Foreign Application Priority Data
Feb. 13, 2019 (JP) .................................. 2019-023728

(51) Int. Cl.
*G06F 3/06* (2006.01)
(52) U.S. Cl.
CPC .......... *G06F 3/0683* (2013.01); *G06F 3/0604* (2013.01); *G06F 3/0655* (2013.01)
(58) Field of Classification Search
None
See application file for complete search history.

(56) References Cited

U.S. PATENT DOCUMENTS

| 2014/0122820 A1 | 5/2014 | Park et al. |
| 2017/0060783 A1 | 3/2017 | Chiu et al. |
| 2018/0107615 A1 | 4/2018 | Egi |

(Continued)

FOREIGN PATENT DOCUMENTS

| EP | 2413484 A2 | 2/2012 |
| JP | 2011-257889 A | 12/2011 |
| JP | 2014-048849 A | 3/2014 |

(Continued)

OTHER PUBLICATIONS

Saidi et al., The Shift to Multicores in Real-Time and Safety-Critical Systems, 2015, IEEE, 10 pages (Year: 2015).*

(Continued)

*Primary Examiner* — Gary W. Cygiel
(74) *Attorney, Agent, or Firm* — Sughrue Mion, PLLC

(57) ABSTRACT

A control device includes a first controller, a second controller and a storage. The first controller performs safety control for a drive device. The second controller performs standard control for the drive device. The storage is accessible by both the first and second controllers and includes a first storage area and a second storage area. The first storage area stores data involved with the safety control, and the second storage area stores data involved with the standard control. The first controller accesses both the first storage area and the second storage area, and the second controller accesses the second storage area but is restricted from accessing the first storage area.

5 Claims, 11 Drawing Sheets

(56) References Cited

U.S. PATENT DOCUMENTS

2018/0165223 A1   6/2018  Lee et al.

FOREIGN PATENT DOCUMENTS

| | | |
|---|---|---|
| JP | 2017-204286 A | 11/2017 |
| JP | 2018-067047 A | 4/2018 |
| WO | 2015/145562 A1 | 10/2015 |

OTHER PUBLICATIONS

Barth et al., Functional Safety on Multicore Microcontrollers for Industrial Applications, 2016, embedded world, 5 pages (Year: 2016).*
Extended European Search Report dated Oct. 21, 2022 in European Application No. 20756160.6.
International Search Report of PCT/JP2020/003096 dated Mar. 17, 2020 [PCT/ISA/210].
Written Opinion of PCT/JP2020/003096 dated Mar. 17, 2020 [PCT/ISA/237].

* cited by examiner

FIG.6

| MODE OF PROCESSOR | | ACCESS SETTING TO RAM | | | |
|---|---|---|---|---|---|
| | | SAFETY STORAGE AREA | | STANDARD STORAGE AREA | |
| | | PRIVILEGED MODE | USER MODE | PRIVILEGED MODE | USER MODE |
| SAFETY CORE | PRIVILEGED MODE | PERMITTED | PERMITTED | PERMITTED | PERMITTED |
| | USER MODE | PROHIBITED | PERMITTED | PROHIBITED | PERMITTED |
| STANDARD CORE | PRIVILEGED MODE | PROHIBITED | PROHIBITED | PERMITTED | PERMITTED |
| | USER MODE | PROHIBITED | PROHIBITED | PROHIBITED | PERMITTED |

CONTROL DEVICE

CROSS REFERENCE TO RELATED APPLICATIONS

This application is a National Stage of International Application No. PCT/JP2020/003096 filed on Jan. 29, 2020, claiming priority based on Japanese Patent Application No. 2019-023728 filed on Feb. 13, 2019, the entire contents of each of which being herein incorporated by reference in their entireties.

TECHNICAL FIELD

The present invention relates to a control device, and more particularly to a control device that controls a drive device.

BACKGROUND ART

In recent years, a control device has been known that includes, in addition to an operating unit that performs standard control for a drive device, an operating unit that performs safety control for the drive device for the sake of ensuring safety, for safe use of facilities and machines at various production sites.

For example, WO 2015/145562 (PTL 1) discloses a controller that includes both a drive CPU (Central Processing Unit) that performs drive control for a drive device, and a safety CPU that preforms safety control for the drive device. It is also disclosed in PTL 1 that the drive CPU and the safety CPU may be implemented as a dual core processor.

CITATION LIST

Patent Literature

PTL 1: WO 2015/145562

SUMMARY OF INVENTION

Technical Problem

Implementing a drive CPU and a safety CPU as a dual core processor as in the controller disclosed in PTL 1 could allow for space saving and cost reduction of a device. However, though the coexistence of an operating unit that performs standard control and an operating unit that performs safety control requires building a scheme for ensuring safety particularly for the sake of protecting data for use in the safety control, no consideration is given in the controller described in PTL 1.

The present invention has an object to solve the problem as described above, and provides a control device capable of ensuring safety even when an operating unit that performs standard control and an operating unit that performs safety control coexist.

Solution to Problem

According to an example of the present disclosure, a control device that controls a drive device is provided. The control device includes: a first operating unit configured to perform safety control for the drive device; a second operating unit configured to perform standard control for the drive device; and a storage unit accessible by both the first operating unit and the second operating unit, the storage unit including a first storage area and a second storage area, the first storage area storing data involved with the safety control, the second storage area storing data involved with the standard control. The first operating unit is configured to access both the first storage area and the second storage area, whereas the second operating unit is configured to access the second storage area but is configured to be restricted from accessing the first storage area.

According to this disclosure, even when the first operating unit configured to perform the safety control and the second operating unit configured to perform the standard control coexist, the second operating unit is configured to be restricted from accessing the first storage area configured to store the data involved with the safety control, and therefore, safety can be ensured without the safety control being affected by the second operating unit configured to perform the standard control.

In the above disclosure, the control device includes a plurality of microcontroller units (MCUs). The first operating unit is a processor core configured to perform the safety control, and the second operating unit is a processor core configured to perform the standard control. Each of the plurality of microcontroller units includes the processor core configured to perform the safety control, and at least one of the plurality of microcontroller units includes the processor core configured to perform the standard control.

According to this disclosure, the coexistence of the processor core configured to perform the safety control and the processor core configured to perform the standard control in a single microcontroller unit allows for space saving and cost reduction of the device.

In the above disclosure, mutual monitoring is performed between the processor cores configured to perform the safety control included respectively in the plurality of microcontroller units.

According to this disclosure, as the mutual monitoring is performed between the plurality of processor cores configured to perform the safety control, safety can be further ensured.

In the above disclosure, the control device includes a microcontroller unit (MCU). The first operating unit is a processor core configured to perform the safety control, and the second operating unit is a processor core configured to perform the standard control. The microcontroller unit includes a plurality of processor cores configured to perform the safety control, and at least one or more processor cores configured to perform the standard control.

According to this disclosure, the coexistence of the processor cores configured to perform the safety control and the processor core configured to perform the standard control in a single microcontroller unit allows for space saving and cost reduction of the device.

In the above disclosure, the control device includes a data table that defines permission and prohibition of access to memory addresses of the storage unit. Based on the data table, the first operating unit is configured to access both a memory address of the first storage area and a memory address of the second storage area, whereas the second operating unit is configured to access the memory address of the second storage area but is configured to be restricted from accessing the memory address of the first storage area.

According to this disclosure, based on the data table that defines permission and prohibition of access to the memory addresses of the storage unit, access from the second operating unit to the first storage area configured to store the data involved with the safety control can be restricted.

In the above disclosure, based on a prescribed instruction, the first operating unit is configured to access both the first storage area and the second storage area, whereas based on the prescribed instruction, the second operating unit is configured to access the second storage area but is configured to be restricted from accessing the first storage area.

According to this disclosure, unlike when access is made by the first operating unit based on the prescribed instruction, when access is made by the second operating unit based on the prescribed instruction, access from the second operating unit to the first storage area configured to store the data involved with the safety control can be restricted.

In the above disclosure, a first mode and a second mode are provided as a mode that defines permission and prohibition of access to the storage unit, the second mode further restricting the access than the first mode. The second operating unit is configured to be restricted from accessing the first storage area regardless of whether the mode is the first mode or the second mode.

According to this disclosure, regardless of whether the mode that defines permission and prohibition of access to the storage unit is the first mode, or the second mode that further restricts the access than the first mode, access to the first storage area configured to store the data involved with the safety control can be restricted.

In the above disclosure, the first operating unit is a processor core configured to perform the safety control, and the second operating unit is a processor core configured to preform the standard control. The control device further includes a monitoring processor, as a coprocessor configured to assist a processor including the processor core configured to perform the standard control and the processor core configured to perform the safety control, the monitoring processor monitoring access from the processor to the first storage area and the second storage area. The second operating unit is configured to be restricted from accessing the first storage area by the monitoring processor.

According to this disclosure, by the monitoring processor that monitors access from the processor including the first operating unit and the second operating unit to the first storage area and the second storage area, access from the second operating unit to the first storage area configured to store the data involved with the safety control can be restricted.

BRIEF DESCRIPTION OF DRAWINGS

FIG. 6 is a schematic diagram for illustrating the second example of the access restricting method in the control device according to the first embodiment.

DESCRIPTION OF EMBODIMENTS

Figure 1:
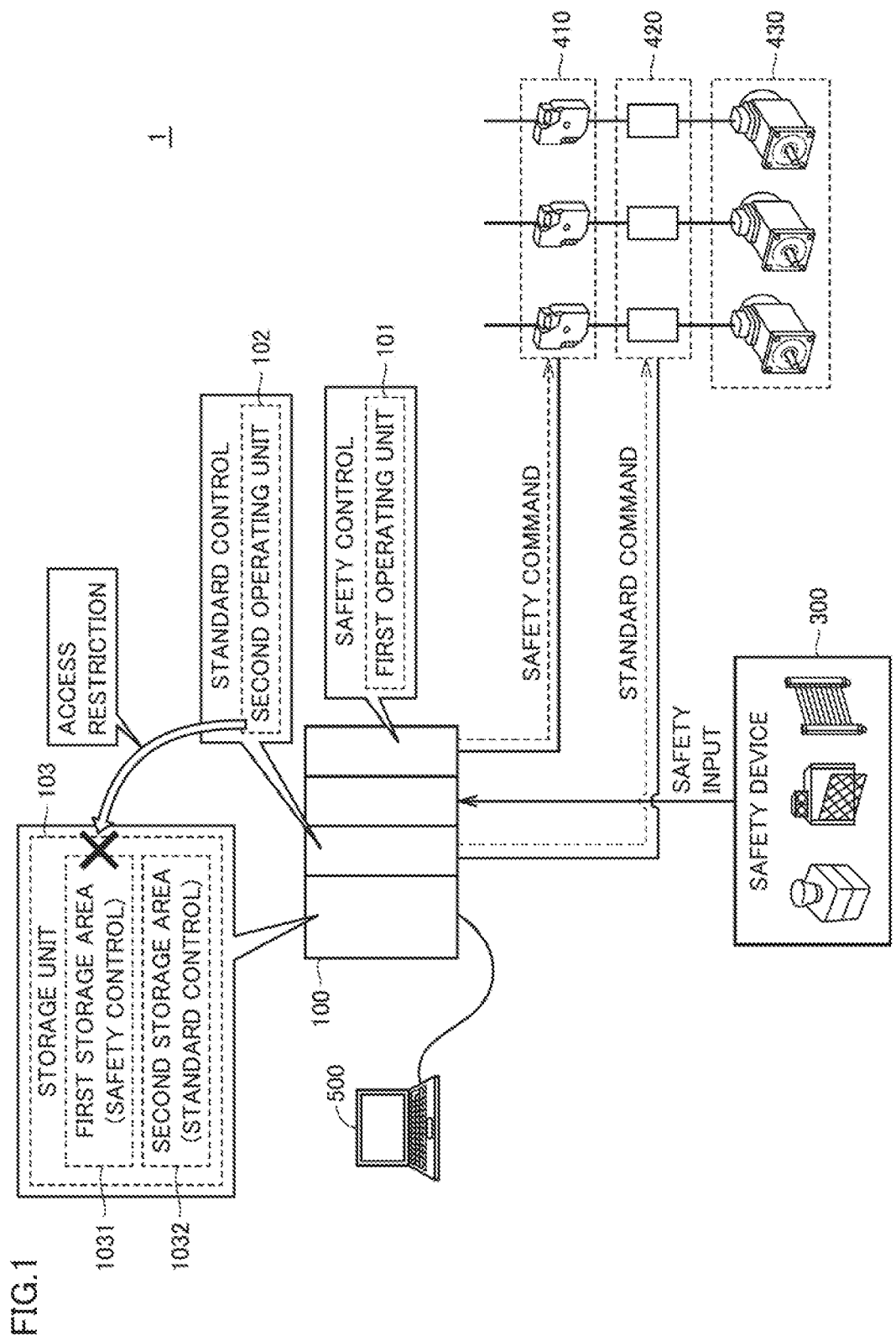
FIG. 1 is a schematic diagram showing an application of a control device according to the present embodiment.

Embodiments of the present invention will be described in detail with reference to the drawings. The same or corresponding elements in the drawings are designated by the same symbols and a description thereof will not be repeated.

[A. Application]

An exemplary scene to which the present invention is applied will be described.

FIG. 1 is a schematic diagram showing an application of a control device 100 according to the present embodiment. A control system 1 according to the present embodiment provides, for example, the safety function defined under IEC 61508. Control system 1 mainly includes control device 100, a safety device 300, and a drive device 430.

Control device 100 is typically implemented by a programmable controller (Programmable Logic Controller: PLC) and the like, executes a predetermined user program for input data acquired from an object to be controlled, and provides a command to the object to be controlled in accordance with output data calculated through the execution of the user program. In the example shown in FIG. 1, the object to be controlled includes drive device 430, and a driver 420 that drives drive device 430.

For example, control device 100 outputs a standard command for controlling drive device 430 to driver 420 when a prescribed drive condition is satisfied, to thereby drive and stop drive device 430. Control device 100 also controls a position, speed and the like of drive device 430 based on a feedback signal and the like from drive device 430. Though drive device 430 is assumed to be a servo motor that is driven by driver 420, drive device 430 is not limited to a servo motor but may be another type of drive device. In the present embodiment, such control over drive device 430 and driver 420 by control device 100 is also referred to as "standard control."

In addition to the standard control described above, control device 100 performs control for ensuring safety of a worker in control system 1.

For example, when control device 100 accepts a safety input from safety device 300 (such as an emergency stop switch, a safety door switch, and a safety light curtain), control device 100 outputs a safety command to a safety relay 410. Safety relay 410 is disposed on a power supply line to driver 420, and performs control for interrupting power supply based on the safety command from control device 100. Power supply to driver 420 is thereby interrupted, causing drive device 430 to stop. Such control over drive device 430 and driver 420 by control device 100 via safety relay 410 is also referred to as "safety control." As the safety control, control device 100 may control the position, speed and the like of drive device 430 by adjusting power to drive device 430.

User programs involved with the standard control and the safety control performed by control device 100, respectively, are provided to control device 100 from a support device 500 communicably connected to control device 100.

Control device 100 includes a first operating unit 101 that performs the above-described safety control for drive device 430, and a second operating unit 102 that performs the above-described standard control for drive device 430. Control device 100 further includes a storage unit 103 accessible by both first operating unit 101 and second operating unit 102, and including a first storage area 1031 that stores data involved with the safety control, and a second storage area 1032 that stores data involved with the standard control.

The "first operating unit" and the "second operating unit" may each be a processor core included in a prescribed processor, or may each be a processor or CPU itself. Alternatively, the "first operating unit" and the "second operating unit" may be processor cores, both of which are included in a single processor, or may be processor cores included respectively in a plurality of processors.

The terms "standard control" and "safety control" are used herein in comparison to each other. The "standard control" is a collective term for processes for controlling an object to be controlled such as drive device 430 in accordance with predetermined required specifications. The "safety control," on the other hand, collectively refers to processes for preventing human safety from being threatened by a facility and a machine in control system 1. The "safety control" is designed to meet requirements for implementing the safety function defined under IEC 61508 and the like.

In control device 100 thus configured, first operating unit 101 is able to access both first storage area 1031 that stores the data involved with the safety control, and second storage area 1032 that stores the data involved with the standard control, and performs the safety control by accessing these storage areas.

Here, as described above, the safety control is defined under IEC 61508 and the like, with a program and data involved with the safety control being designed in advance by a manufacturer of control device 100. Thus, if first storage area 1031 is accessed by second operating unit 102 based on a program and data involved with the standard control, the safety may not be ensured. In control device 100 according to the present embodiment, therefore, second operating unit 102 is able to access second storage area 1032 that stores the data involved with the standard control, but is restricted from accessing first storage area 1031 that stores the data involved with the safety control. For example, in control device 100, when second operating unit 102 is trying to access first storage area 1031, exception handling is performed to restrict the access from second operating unit 102 to first storage area 1031.

As a result, even when first operating unit 101 that performs the safety control and second operating unit 102 that performs the standard control coexist, second operating unit 102 is restricted from accessing first storage area 1031 that stores the data involved with the safety control, and therefore, safety can be ensured without the data involved with the safety control stored in first storage area 1031 being affected by second operating unit 102 that performs the standard control.

B. First Embodiment

Control device 100 according to a first embodiment will be described.

a1. Exemplary Hardware Configuration of Control Device

Figure 2:
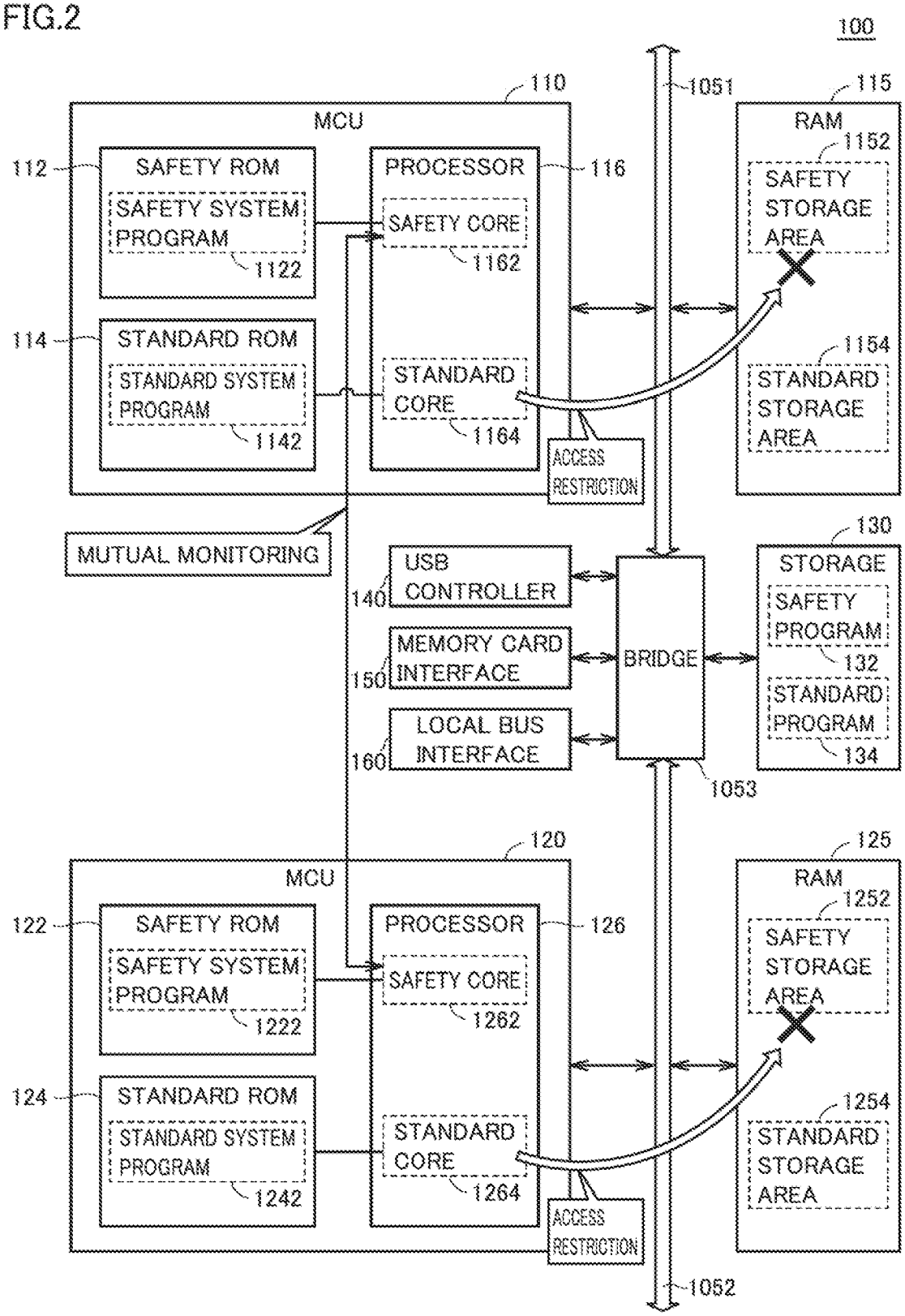
FIG. 2 is a schematic diagram showing an exemplary hardware configuration of the control device according to a first embodiment.

FIG. 2 is a schematic diagram showing an exemplary hardware configuration of control device 100 according to the first embodiment. As shown in FIG. 2, control device 100 includes a plurality of microcontroller units (MCUs), and a plurality of RAMs (Random access memories) corresponding to the plurality of MCUs, respectively. In the present embodiment, control device 100 includes an MCU 110 and an MCU 120, a RAM 115 corresponding to MCU 110, and a RAM 125 corresponding to MCU 120. The number of MCUs and RAMs is not limited to two, and three or more MCUs and RAMs may be provided.

Control device 100 also includes a storage 130, a USB controller 140, a memory card interface 150, and a local bus interface 160. These components are connected to processor buses 1051 and 1052 via a bridge 1053. MCU 110 is connected to processor bus 1051, and MCU 120 is connected to processor bus 1052.

Storage 130 stores various types of programs and data, such as a safety program 132 involved with the safety control and created by a user in accordance with a required safety function, and a standard program 134 involved with the standard control and created by the user in accordance with an object to be controlled.

USB controller 140 exchanges data with support device 500 and the like through a USB connection.

Memory card interface 150 is configured to write data to an accepted memory card, and to read various types of data (such as a log and trace data) from the memory card.

Local bus interface 160 exchanges data, via a local bus, with appropriate devices such as safety relay 410, driver 420, and safety device 300 connected to control device 100.

MCU 110 includes a processor 116, a safety ROM (Read Only Memory) 112, and a standard ROM 114.

Processor 116 is a multicore processor, and includes a safety core 1162 and a standard core 1164. Safety core 1162 is one example of a "first operating unit," and performs a control operation involved with the safety control. Standard core 1164 is one example of a "second operating unit," and performs a control operation involved with the standard control. The coexistence of safety core 1162 involved with the safety control and standard core 1164 involved with the standard control in single processor 116 in this manner allows for space saving and cost reduction of the device.

Safety ROM 112 stores a safety system program 1122 for implementing basic functions involved with the safety control, and is connected to safety core 1162.

Standard ROM 114 stores a standard system program 1142 for implementing basic functions involved with the standard control, and is connected to standard core 1164.

MCU 120 includes a processor 126, a safety ROM 122, and a standard ROM 124.

Processor 126 is a multicore processor, and includes a safety core 1262 and a standard core 1264. Safety core 126 is one example of a "first operating unit," and performs a control operation involved with the safety control. Standard core 1264 is one example of a "second operating unit," and performs a control operation involved with the standard control.

The coexistence of safety core 1262 involved with the safety control and standard core 1264 involved with the standard control in single processor 126 in this manner allows for space saving and cost reduction of the device, as compared to when the safety core and the standard core are included in separate processors, respectively.

Safety ROM 122 stores a safety system program 1222 for implementing basic functions involved with the safety control, and is connected to safety core 1262.

Standard ROM 124 stores a standard system program 1242 for implementing basic functions involved with the standard control, and is connected to standard core 1264.

Control device 100 is configured such that processor 116 and processor 126 mutually monitor their operations and states through cross-communication between them. As a result, even when an abnormality occurs in one of processor 116 and processor 126, the abnormality is detected.

For example, processor 116 and processor 126 execute programs in parallel. In addition, processor 116 and processor 126 each have a not-shown watchdog timer. Processor 116 periodically resets its own watchdog timer, and processor 126 also periodically resets its own watchdog timer. Processor 116 monitors whether the watchdog timer is periodically reset by processor 126, and processor 126 monitors whether the watchdog timer is periodically reset by processor 116, to thereby mutually monitor the presence or absence of abnormality between the processors.

For example, when executing the programs in parallel, processor 116 and processor 126 mutually check calculation results of control operations involved with the execution of the programs, to thereby mutually monitor the presence or absence of abnormality between the processors. That is, when some abnormality occurs in one of the processors that results in an inaccurate calculation result of the control operation, the calculation result will not match a calculation result of the control operation in the other processor. Thus, the other processor can detect that an abnormality has occurred in one of the processors by detecting a mismatch between the calculation results.

As the mutual monitoring is performed in this manner between the plurality of safety core 1162 and safety core 1262 that perform the safety control, safety can be further ensured.

For a processor in which an abnormality has occurred, control device 100 performs a process such as interrupting power supply, to prevent the safety control from being performed while the abnormality is occurring. In this manner, the plurality of independently provided processors 116 and 126 can detect the occurrence of abnormality by mutually monitoring the operations and states. In particular, since safety cores 1162 and 1262 are for performing the safely control to ensure safety, a safety level can be further enhanced by the mutual monitoring.

RAM 115 is one example of a "storage unit." A storage area of RAM 115 includes a safety storage area 1152 and a standard storage area 1154. Safety storage area 1152 is one example of a "first storage area," and stores data for performing the safety control. Standard storage area 1154 is one example of a "second storage area," and stores data for performing the standard control.

Safety core 1162 of processor 116 implements the safety control by reading safety system program 1122 stored in safety ROM 112, and developing and executing the program in the storage area in RAM 115. Likewise, standard core 1164 of processor 116 implements the standard control by reading standard system program 1142 stored in standard ROM 114, and developing and executing the program in the storage area in RAM 115.

Safety core 1162 and standard core 1164 of processor 116 implement the safety control and the standard control by accessing RAM 115 in this manner, where safety core 1162 is permitted to access standard storage area 1154, whereas standard core 1164 is restricted from accessing safety storage area 1152 for the sake of ensuring safety. For example, in control device 100, when standard core 1164 is trying to access safety storage area 1152, exception handling is performed to restrict the access from standard core 1164 to safety storage area 1152.

This can prevent some abnormality from occurring in the data involved with the safety control stored in safety storage area 1152 due to the access from standard core 1164, thereby ensuring safety.

RAM 125 is one example of a "storage unit." A storage area of RAM 125 includes a safety storage area 1252 and a standard storage area 1254. Safety storage area 1252 is one example of a "first storage area," and stores data for performing the safety control. Standard storage area 1254 is one example of a "second storage area," and stores data for performing the standard control.

Safety core 1262 of processor 126 implements the safety control by reading safety system program 1222 stored in safety ROM 122, and developing and executing the program in the storage area in RAM 125. Likewise, standard core 1264 of processor 126 implements the standard control by reading standard system program 1242 stored in standard ROM 124, and developing and executing the program in the storage area in RAM 125.

Safety core 1262 and standard core 1264 of processor 126 perform the safety control and the standard control by accessing RAM 125 in this manner, where safety core 1262 is permitted to access standard storage area 1254, whereas standard core 1264 is restricted from accessing safety storage area 1252 for the sake of ensuring safety. For example, in control device 100, when standard core 1264 is trying to access safety storage area 1252, exception handling is performed to restrict the access from standard core 1264 to safety storage area 1252.

This can prevent some abnormality from occurring in the data involved with the safety control stored in safety storage arcs 1252 due to the access from standard core 1264, thereby ensuring safety.

b1. First Example of Access Restricting Method in Control Device

Figure 3:
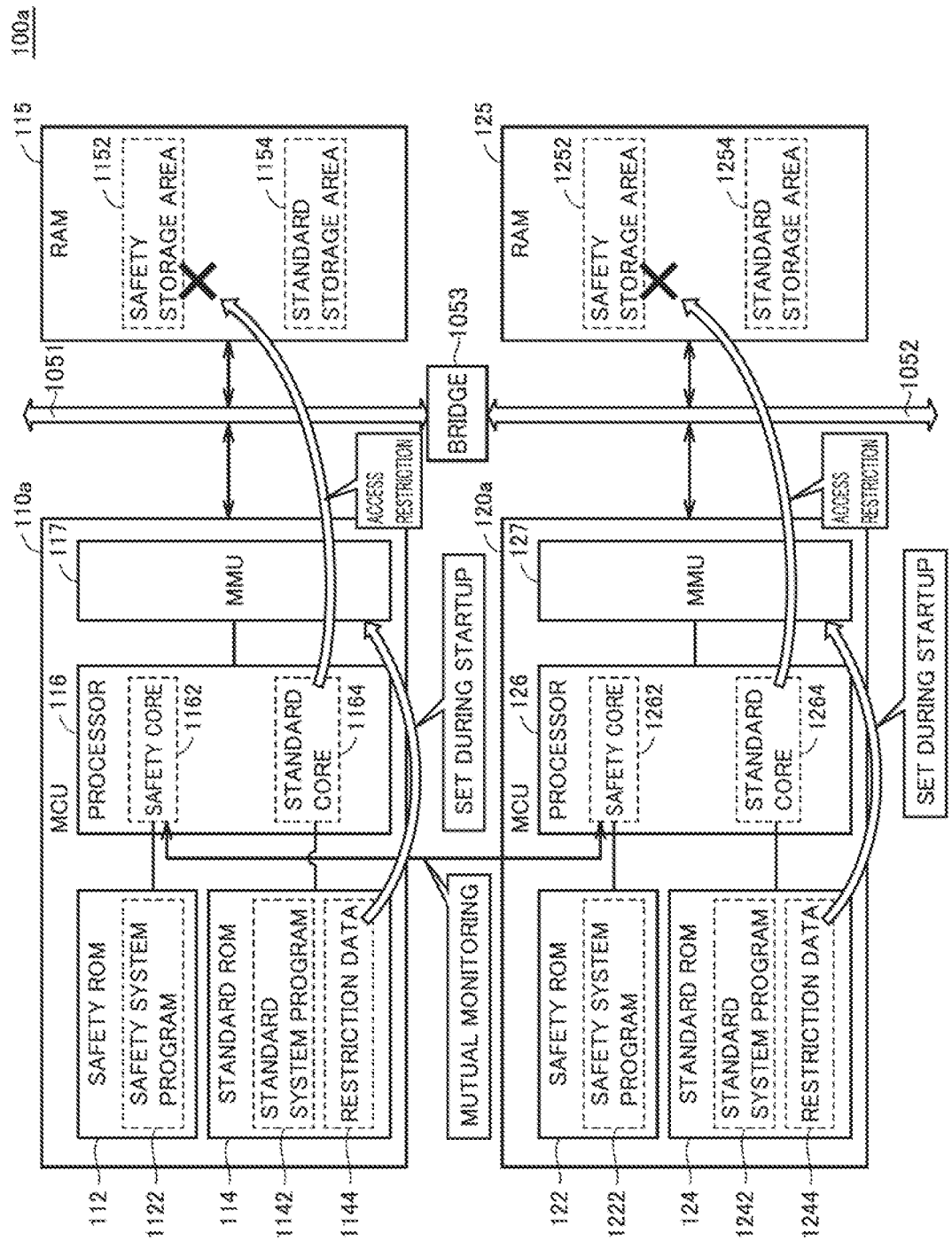
FIG. 3 is a schematic diagram for illustrating a first example of an access restricting method in the control device according to the first embodiment.
Figure 4:
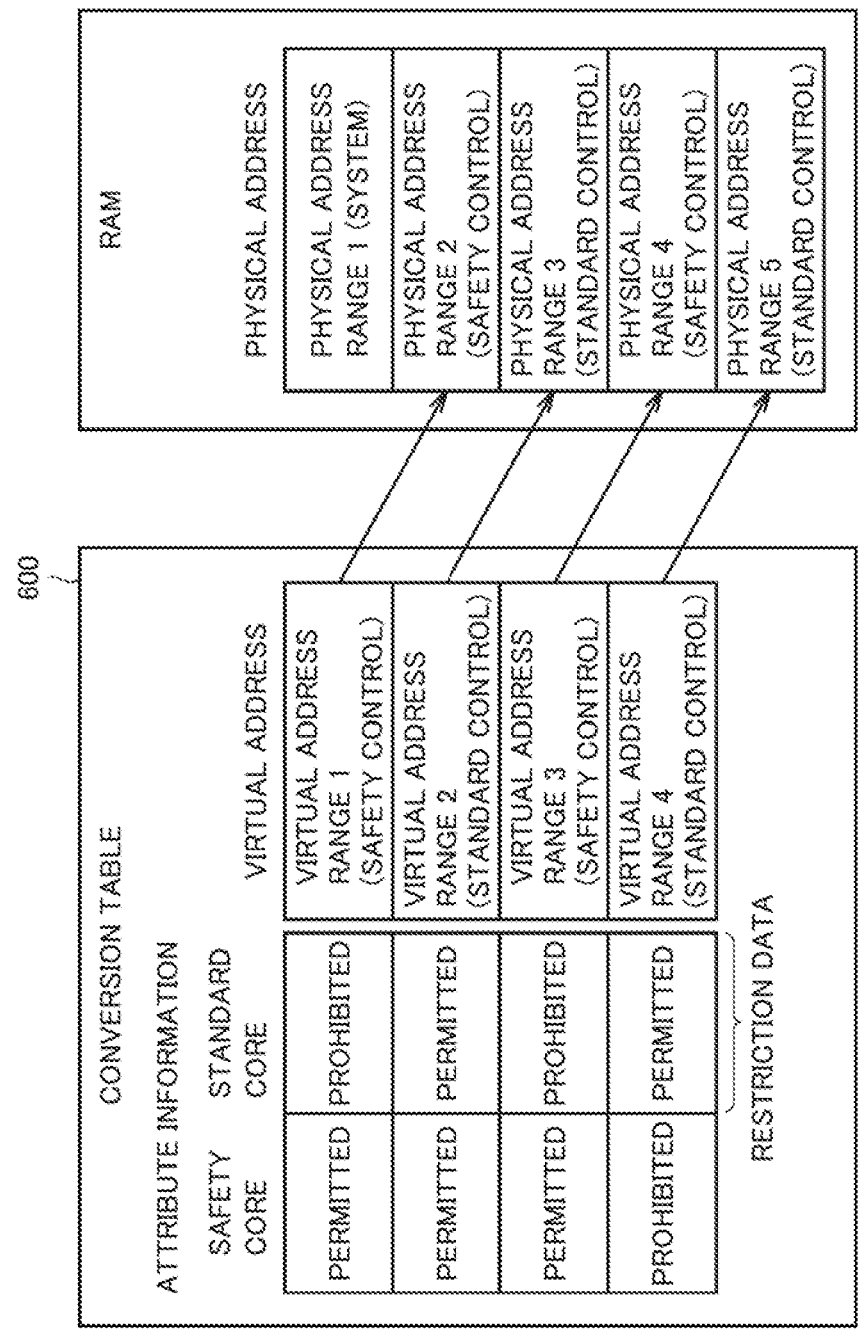
FIG. 4 is a schematic diagram for illustrating the first example of the access restricting method in the control device according to the first embodiment.

FIGS. 3 and 4 are schematic diagrams for illustrating a first example of an access restricting method in a control device 100*a* according to the first embodiment. In an exemplary hardware configuration of control device 100*a* shown in FIG. 3, elements having the same configuration and function as those in the exemplary hardware configuration of control device 100 shown in FIG. 2 are designated by the same symbols and a description thereof will not be repeated.

As shown in FIG. 3, an MCU 110*a* of control device 100*a* includes an MMU (Memory Management Unit) 117 connected to processor 116. MMU 117 has a memory protecting function, and prevents each core in processor 116 from accessing a storage area not assigned to the core. Specifically, in MMU 117, a conversion table 600 shown in FIG. 4 is set during startup, and control device 100*a* utilizes this conversion table 600 to restrict access from standard core 1164 to safety storage area 1152.

For example, standard ROM 114 includes restriction data 1144 for restricting access from standard core 1164 to safety storage area 1152. This restriction data 1144 is set in MMU 117 during startup of MCU 110a, and conversion table 600 corresponding to standard core 1164 is thereby constructed. Though not shown, safety ROM 112 also stores data for constructing conversion table 600. This data is set in MMU 117 during startup of MCU 110a, and conversion table 600 corresponding to safety core 1162 is thereby constructed.

Conversion table 600 is one example of a "data table," and includes, as shown in FIG. 4, attribute information for determining the type of a core between safety core 1162 and standard core 1164, and a virtual address that is converted to a physical address of RAM 115.

For example, the physical address of RAM 115 is divided into a physical address range 1 for system (for example, 0000 to 3FFF), a physical address range 2 for safety control (for example, 4000 to 4FFF), a physical address range 3 for standard control (for example, 5000 to 5FFF), a physical address range 4 for safety control (for example, 6000 to 6FFF), and a physical address range 5 for standard control (for example, 7000 to 7FFF). Physical address range 2 and physical address range 4 for safety control are address ranges corresponding to safety storage area 1152. Physical address range 3 and physical address range 5 for standard control are address ranges corresponding to standard storage area 1154.

The virtual address of conversion table 600 excludes an address range for system, and is divided into a virtual address range 1 for safety control (for example, 0000 to 0FFF), a virtual address range 2 for standard control (for example, 1000 to 1FFF), a virtual address range 3 for safety control (for example, 2000 to 2FFF), and a virtual address range 4 for standard control (for example, 3000 to 3FFF). Virtual address range 1 can be converted to physical address range 2, virtual address range 2 can be converted to physical address range 3, virtual address range 3 can be converted to physical address range 4, and virtual address range 4 can be converted to physical address range 5.

Safety core 1162 and standard core 1164 can each access the physical address of RAM 115 by accessing a virtual address assigned in conversion table 600.

Here, permission or prohibition of access to the virtual address from each of safety core 1162 and standard core 1164 is set. For example, safety core 1162 is permitted to access not only virtual address range 1 and virtual address range 3 for safety control, but also virtual address range 2 for standard control. Standard core 1164, on the other hand, is permitted to access virtual address range 2 and virtual address range 4 for standard control, but is prohibited (restricted) from accessing virtual address range 1 and virtual address range 3 for safety control.

In this manner, in conversion table 600 set in MMU 117, access from standard core 1164 to virtual address range 1 and virtual address range 3 for safety control is restricted, and therefore, access from standard core 1164 to physical address range 2 and physical address range 4 for safety control in RAM 115 (that is, safety storage area 1152) corresponding to virtual address range 1 and virtual address range 3 is also restricted. As a result, based on conversion table 600 that defines permission and prohibition of access to the physical address of RAM 115, access from standard core 1164 to safety storage area 1152 that stores the data involved with the safety control can be restricted.

Likewise, an MCU 120a of control device 100a includes an MMU 127 connected to processor 126. Like MMU 117, MMU 127 has a memory protecting function, and prevents each core in processor 126 from accessing a storage area not assigned to the core. Specifically, as in MMU 117, in MMU 127, conversion table 600 shown in FIG. 4 is set during startup, and control device 100a utilizes this conversion table 600 to restrict access from standard core 1264 to safety storage area 1252. Conversion table 600 in MMU 127 has a similar configuration and function to conversion table 600 in MMU 117, and therefore a description thereof will not be repeated.

In this manner, in conversion table 600 set in MMU 127, access from standard core 1264 to virtual address range 1 and virtual address range 3 for safety control is restricted, and therefore, access from standard core 1264 to physical address range 2 and physical address range 4 for safety control in RAM 125 (that is, safety storage area 1252) corresponding to virtual address range 1 and virtual address range 3 is restricted. As a result, based on conversion table 600 that defines permission and prohibition of access to the physical address of RAM 125, access from standard core 1264 to safety storage area 1252 that stores the data involved with the safety control can be restricted.

Though common conversion table 600 is used for a safety core and a standard core to set permission or prohibition of access based on the attribute information in the first example of the access restricting method shown in FIGS. 3 and 4, conversion table 600 for a safety core and conversion table 600 for a standard core may be provided.

In addition, though an MMU is employed in the first example of the access restricting method shown in FIGS. 3 and 4, an MPU (Memory Protection Unit) having a memory protecting function like the MMU may be employed. Since an MPU does not perform a conversion from a virtual address to a physical address, permission or prohibition of access to each address range corresponding to the physical address may be set for each of a safety core and a standard core.

c1. Second Example of Access Restricting Method in Control Device

Figure 5:
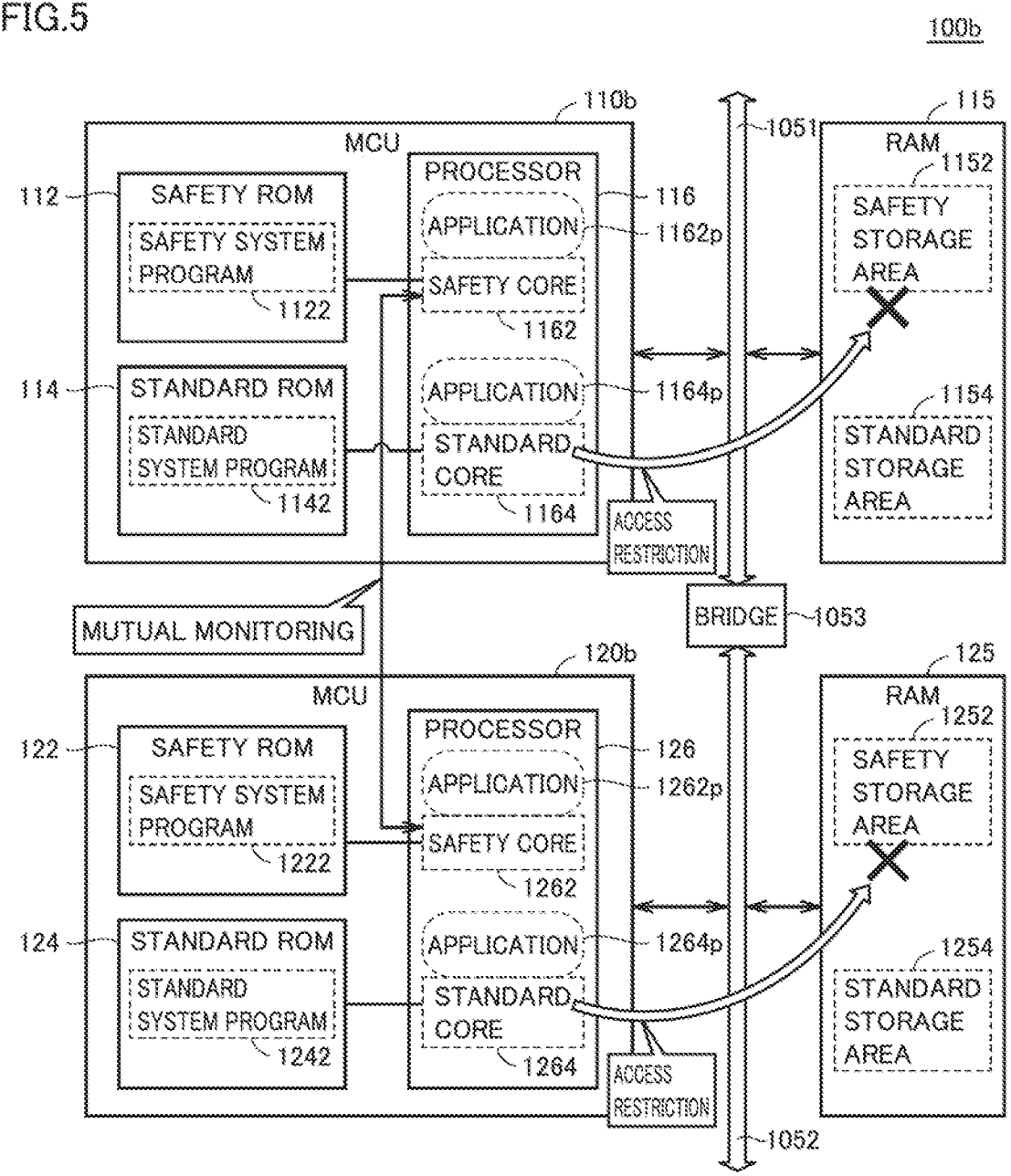
FIG. 5 is a schematic diagram for illustrating a second example of an access restricting method in the control device according to the first embodiment.

FIGS. 5 and 6 are schematic diagrams for illustrating a second example of an access restricting method in a control device 100b according to the first embodiment. In an exemplary hardware configuration of control device 100b shown in FIG. 5, elements having the same configuration and function as those in the exemplary hardware configuration of control device 100 shown in FIG. 2 are designated by the same symbols and a description thereof will not be repeated. Though a RAM is illustrated as one example of a "storage unit" in FIG. 6, not only a volatile memory such as a RAM but also a non-volatile memory such as a ROM may be applied to the "storage unit," and any other storage medium including storage areas that store data involved with the safety control and data involved with the standard control may be applied.

As shown in FIGS. 5 and 6, in an MCU 110b of control device 100b, access from standard core 1164 to safety storage area 1152 is restricted.

Specifically, as shown in FIG. 6, as a mode indicative of a state of processor 116, a privileged mode and a user mode are provided for each of safety core 1162 and standard core 1164. In an access setting to RAM 115, too, a privileged mode and a user mode are specified for each of safety storage area 1152 and standard storage area 1154. The privileged mode is one example of a "first mode," and the user mode is one example of a "second mode."

When each of safety core 1162 and standard core 1164 is set to the user mode, and a prescribed instruction in applications 1162p and 1164p is executed, access to a storage area specified in the privileged mode is prohibited. In other words, access is more restricted when the user mode is set, than when the privileged mode is set.

For example, when safety core 1162 is set to the user mode, and a prescribed instruction in application 1162p is executed, access is permitted to each of safety storage area 1152 and standard storage area 1154 that is specified in the user mode, whereas access is prohibited to each of safety storage area 1152 and standard storage area 1154 that is specified in the privileged mode.

For example, when standard core 1164 is set to the user mode, and a prescribed instruction in application 1164p is executed, access is permitted to standard storage area 1154 specified in the user mode, whereas access is prohibited to standard storage area 1154 specified in the privileged mode.

It should be noted here that standard core 1164 is, regardless of whether being set to the privileged mode or the user mode, restricted from accessing safety storage area 1152 specified in both the privileged mode and the user mode. For example, when standard core 1164 is trying to access safety storage area 1152, exception handling is performed to restrict the access from standard core 1164 to safety storage area 1152.

In other words, when safety core 1162 accesses RAM 115 based on a prescribed instruction in application 1162p, safety core 1162 is able to access both safety storage area 1152 and standard storage area 1154 as shown in FIG. 6, whereas when standard core 1164 accesses RAM 115 based on the same prescribed instruction in application 1164p, standard core 1164 is able to access standard storage area 1154 but is restricted from accessing safety storage area 1152 as shown in FIG. 6.

In this manner, unlike when access is made by safety core 1162 based on a prescribed instruction, when access is made by standard core 1164 based on the same prescribed instruction, access from standard core 1164 to safety storage area 1152 that stores the data involved with the safety control can be restricted.

In addition, regardless of whether the mode that defines permission and prohibition of access to the storage areas of RAM 115 is the privileged mode, or the user mode that further restricts the access than the privileged mode, access from standard core 1164 to safety storage area 1152 that stores the data involved with the safety control can be restricted.

Likewise, as shown in FIGS. 5 and 6, in an MCL 120b of control device 100b, access from standard core 1264 to safety storage area 1252 is restricted. A mode indicative of a state of processor 126 and an accessing setting to RAM 125 shown in FIG. 6 are the same as the mode indicative of the state of processor 116 and the accessing setting to RAM 115 described above, and therefore a description thereof will not be repeated.

When safety core 1262 accesses RAM 125 based on a prescribed instruction in an application 1262p, safety core 1262 is able to access both safety storage area 1252 and standard storage area 1254 as shown in FIG. 6, whereas when standard core 1264 accesses RAM 125 based on the same prescribed instruction in an application 1264p, standard core 1264 is able to access standard storage area 1254 but is restricted from accessing safety storage area 1252 as shown in FIG. 6. For example, when standard core 1264 is trying to access safety storage area 1252, exception handling is performed to restrict the access from standard core 1264 to safety storage area 1252.

In this manner, unlike when access is made by safety core 1262 based on a prescribed instruction, when access is made by standard core 1264 based on the same prescribed instruction, access from standard core 1264 to safety storage area 1252 that stores the data involved with the safety control can be restricted.

In addition, regardless of whether the mode that defines permission and prohibition of access to the storage areas of RAM 125 is the privileged mode, or the user mode that further restricts the access than the privileged mode, access from standard core 1264 to safety storage area 1252 that stores the data involved with the safety control can be restricted.

d1. Third Example of Access Restricting Method in Control Device

Figure 7:
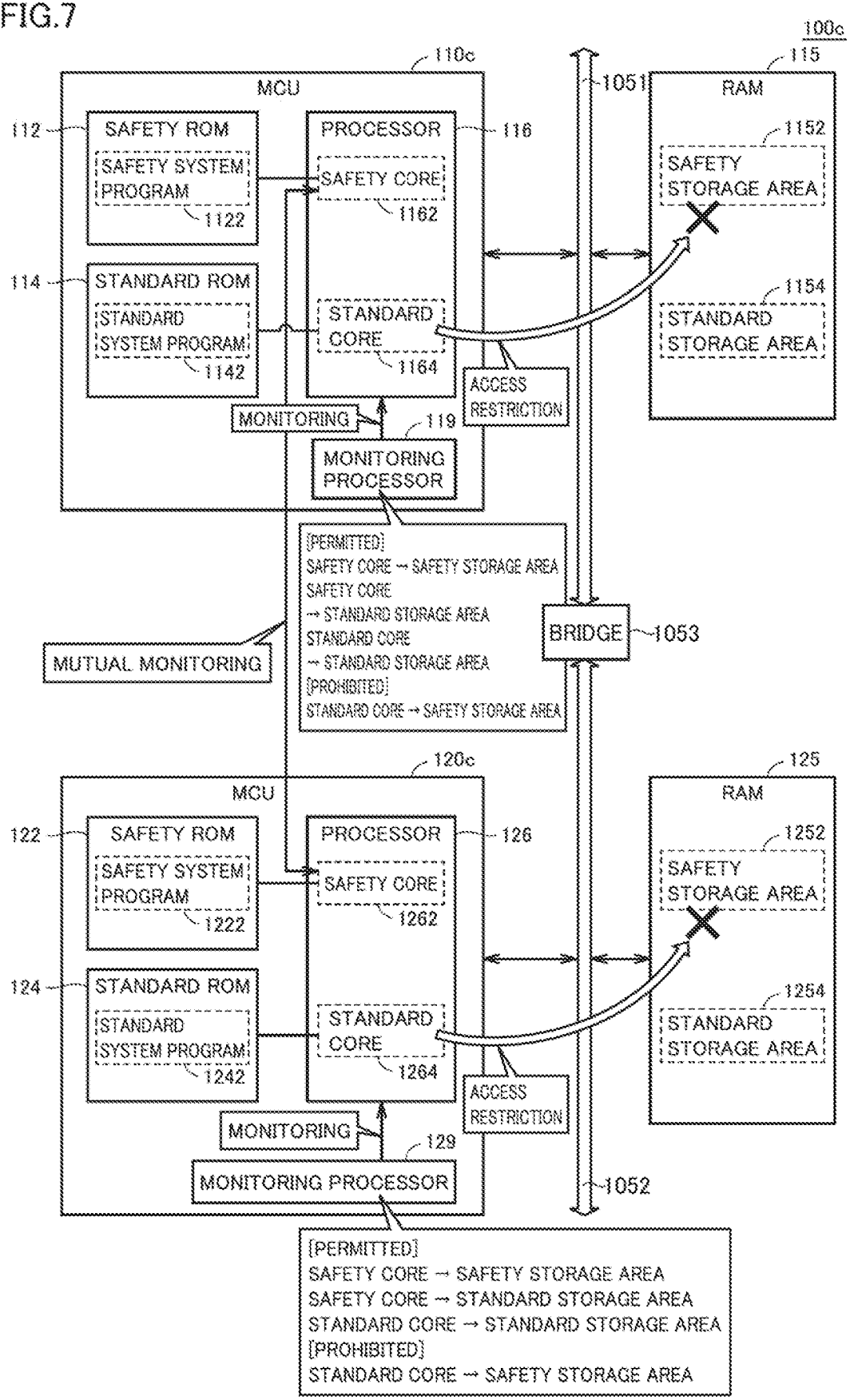
FIG. 7 is a schematic diagram for illustrating a third example of an access restricting method in the control device according to the first embodiment.

FIG. 7 is a schematic diagram for illustrating a third example of an access restricting method in a control device 100c according to the first embodiment. In an exemplary hardware configuration of control device 100c shown in FIG. 7, elements having the same configuration and function as those in the exemplary hardware configuration of control device 100 shown in FIG. 2 are designated by the same symbols and a description thereof will not be repeated.

As shown in FIG. 7, an MCU 110c of control device 100c includes a monitoring processor 119 connected to processor 116. Monitoring processor 119 is a coprocessor that assists processor 116, and is implemented by an FPGA (Field Programmable Gate Array), an ASIC (Application Specific Integrated Circuit), and the like. Monitoring processor 119 monitors access to the storage areas of RAM 115 from each of safety core 1162 and standard core 1164 included in processor 116. Monitoring processor 119 is not limited to one that is included in MCU 110c, and may monitor processor 116 of MCU 110c from outside of this MCU 110c.

Specifically, monitoring processor 119 permits access from safety core 1162 to safety storage area 1152, permits access from safety core 1162 to standard storage area 1154, permits access from standard core 1164 to standard storage area 1154, and prohibits access from standard core 1164 to safety storage area 1152. For example, when it is detected by monitoring processor 119 that standard core 1164 is trying to access safety storage area 1152, exception handling is performed to restrict the access from standard core 1164 to safety storage area 1152.

As a result, by monitoring processor 119 that monitors access from processor 116 to safety storage area 1152 and standard storage area 1154, the access from standard core 1164 to safety storage area 1152 can be restricted.

Likewise, as shown in FIG. 7, an MCU 120c of control device 100c includes a monitoring processor 129 connected to processor 126. Monitoring processor 129 is a coprocessor that assists processor 126, and is implemented by an FPGA, an ASIC, and the like. Monitoring processor 129 monitors access to the storage areas of RAM 125 from each of safety core 1262 and standard core 1264 included in processor 126. Monitoring processor 129 is not limited to one that is included in MCU 120c, and may monitor processor 126 of MCU 120c from outside of this MCU 120c.

Specifically, monitoring processor 129 permits access from safety core 1262 to safety storage area 1252, permits access from safety core 1262 to standard storage area 1254, permits access from standard core 1264 to standard storage area 1254, and prohibits access from standard core 1264 to safety storage area 1252. For example, when it is detected by monitoring processor 129 that standard core 1264 is trying to access safety storage area 1252, exception handling is performed to restrict the access from standard core 1264 to safety storage area 1252.

As a result, by monitoring processor 129 that monitors access from processor 126 to safety storage area 1252 and standard storage area 1254, the access from standard core 1264 to safety storage area 1252 can be restricted.

C. Second Embodiment

A control device 200 according to a second embodiment will be described.

a2. Exemplary Hardware Configuration of Control Device

Figure 8:
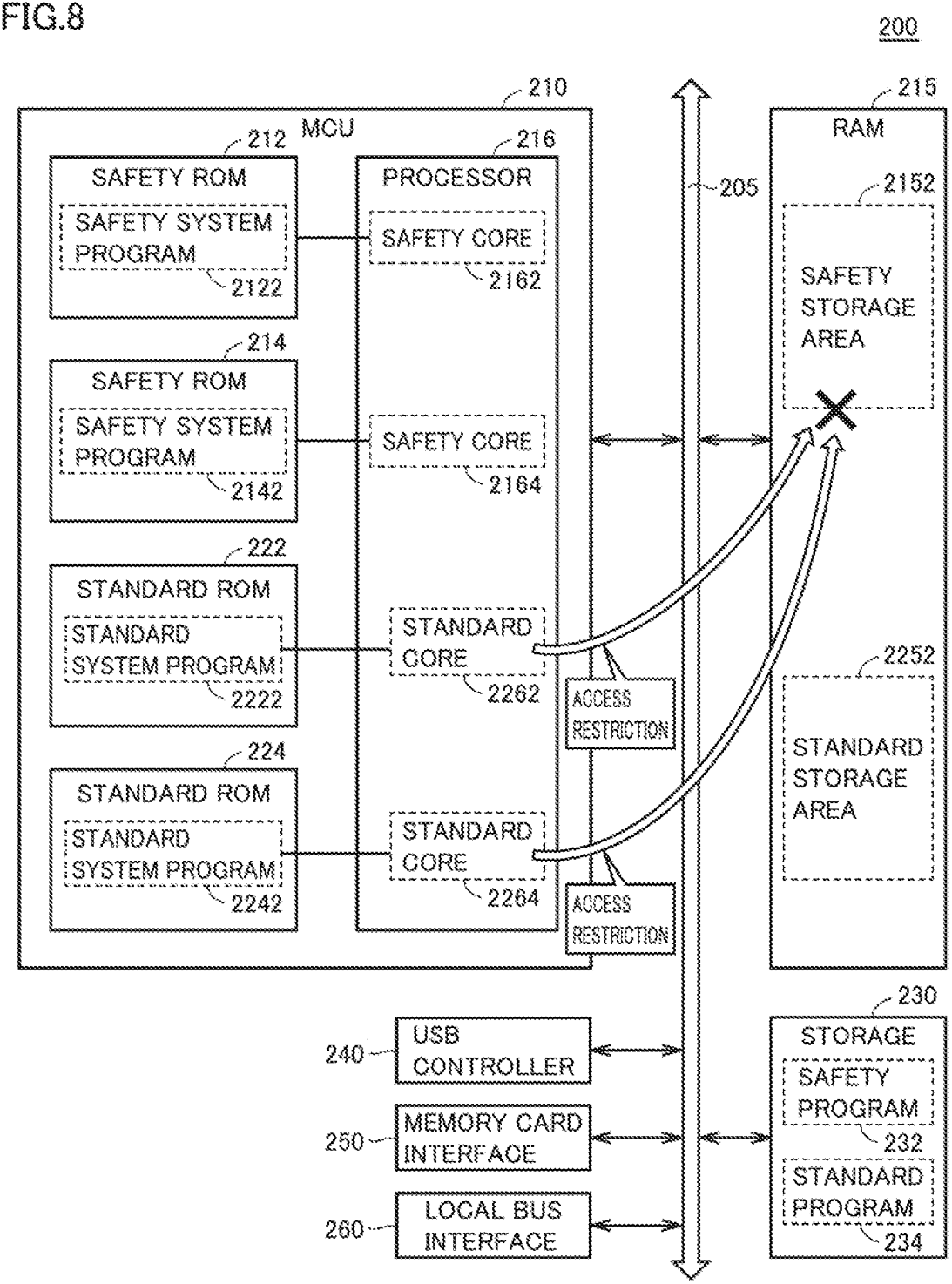
FIG. 8 is a schematic diagram showing an exemplary hardware configuration of a control device according to a second embodiment.

FIG. 8 is a schematic diagram showing an exemplary hardware configuration of control device 200 according to the second embodiment. Control device 100 according to the first embodiment shown in FIG. 2 and control device 200 according to the second embodiment shown in FIG. 8 are different in that the former includes a safety core in each of the plurality of MCUs and a standard core in at least one of the plurality of MCUs, whereas the latter includes a plurality of safety cores and at least one or more standard cores in a single MCU.

Specifically, as shown in FIG. 8, control device 200 includes one MCU 210, and a RAM 215 corresponding to MCU 210. The number of MCUs and RAMs is not limited to one, and two or more MCUs and RAMs may be provided.

Control device 200 also includes a storage 230, a USB controller 240, a memory card interface 250, and a local bus interface 260. These components are connected to one another via a processor bus 205.

Storage 230, USB controller 240, memory card interface 250, and local bus interface 260 have similar configurations to storage 130, USB controller 140, memory card interface 150, and local bus interface 160 shown in FIG. 2, respectively. Storage 230 stores various types of programs and data, such as a safety program 232 involved with the safety control and created by a user in accordance with a required safety function, and a standard program 234 involved with the standard control and created by the user in accordance with an object to be controlled.

MCU 210 includes a processor 216, a safety ROM 212, a safety ROM 214, a standard ROM 222, and a standard ROM 224.

Processor 216 is a multicore processor, and includes a safety core 2162, a safety core 2164, a standard core 2262, and a standard core 2264. Each of safety core 2162 and safety core 2164 is one example of a "first operating unit," and performs a control operation involved with the safety control. Each of standard core 2262 and standard core 2264 is one example of a "second operating unit," and performs a control operation involved with the standard control.

The coexistence of safety core 2162 and safety core 2164 involved with the safety control and standard core 2262 and standard core 2264 involved with the standard control in single processor 216 in this manner allows for space saving and cost reduction of the device, as compared to when the safety cores and the standard cores are included in separate processors, respectively.

Safety ROM 212 stores a safety system program 2122 for implementing basic functions involved with the safety control, and is connected to safety core 2162.

Safety ROM 214 stores a safety system program 2142 for implementing basic functions involved with the safety control, and is connected to safety core 2164.

Standard ROM 222 stores a standard system program 2222 for implementing basic functions involved with the standard control, and is connected to standard core 2262.

Standard ROM 224 stores a standard system program 2242 for implementing basic functions involved with the standard control, and is connected to standard core 2264.

RAM 215 is one example of a "storage unit." A storage area of RAM 215 includes a safety storage area 2152 and a standard storage area 2252. Safety storage area 2152 is one example of a "first storage area," and stores data for performing the safety control. Standard storage area 2252 is one example of a "second storage area," and stores data for performing the standard control.

Safety core 2162 implements the safety control by reading safety system program 2122 stored in safety ROM 212, and developing and executing the program in the storage area in RAM 215. Safety core 2164 implements the safety control by reading safety system program 2142 stored in safety ROM 214, and developing and executing the program in the storage area in RAM 215. Likewise, standard core 2262 implements the standard control by reading standard system program 2222 stored in standard ROM 222, and developing and executing the program in the storage area in RAM 215. Standard core 2264 implements the standard control by reading standard system program 2242 stored in standard ROM 224, and developing and executing the program in the storage area in RAM 215.

Safety cores 2162, 2164 and standard cores 2262, 2264 of processor 216 perform the safety control and the standard control by accessing RAM 215 in this manner, where safety cores 2162 and 2164 are permitted to access standard storage area 2252, whereas standard cores 2262 and 2264 are restricted from accessing safety storage area 2152 for the sake of ensuring safety. For example, in control device 200, when standard cores 2262 and 2264 are trying to access safety storage area 2152, exception handling is performed to restrict the access from standard cores 2262 and 2264 to safety storage area 2152.

This can prevent some abnormality from occurring in the data involved with the safety control stored in safety storage area 2152 due to the access from standard cores 2262 and 2264, thereby ensuring safety.

b2. First Example of Access Restricting Method in Control Device

Figure 9:
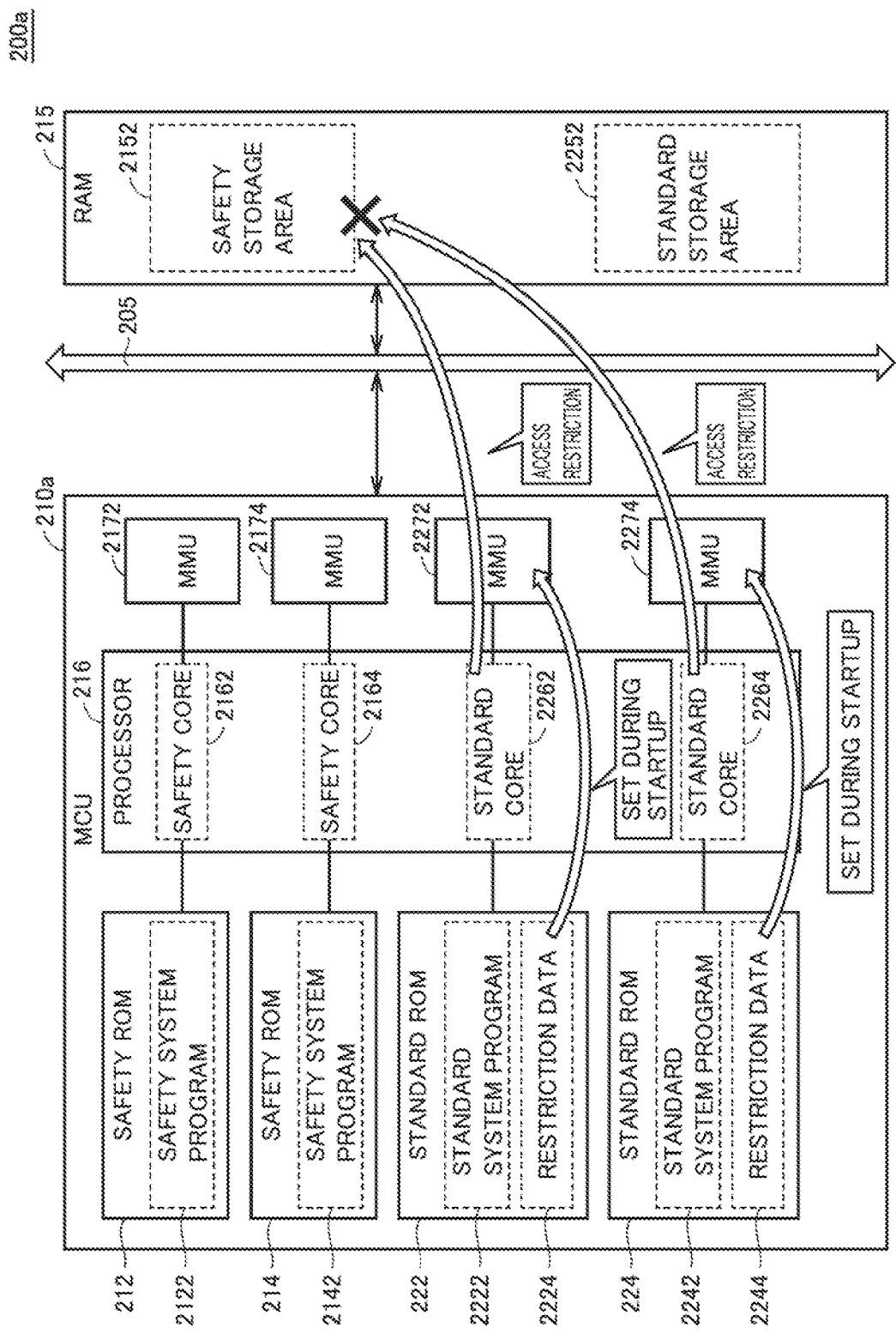
FIG. 9 is a schematic diagram for illustrating a first example of an access restricting method in the control device according to the second embodiment.

FIG. 9 is a schematic diagram for illustrating a first example of an access restricting method in a control device 200a according to the second embodiment. In an exemplary hardware configuration of control device 200a shown in FIG. 9, elements having the same configuration and function as those in the exemplary hardware configuration of control device 200 shown in FIG. 8 are designated by the same symbols and a description thereof will not be repeated. In addition, in the first example of the access restricting method in control device 200a according to the second embodiment shown in FIG. 9, a description of elements having the same configuration and function as those in the first example of the access restricting method in control device 100a according to the first embodiment shown in FIGS. 3 and 4 will not be repeated.

As shown in FIG. 9, an MCU 210a of control device 200a includes MMUs 2172, 2174, 2272 and 2274 connected to processor 216. MMU 2172 is connected to safety core 2162, MMU 2174 is connected to safety core 2164, MMU 2272 is connected to standard core 2262, and MMU 2274 is connected to standard core 2264. Like MMU 117 and MMU 127 shown in FIG. 3, MMUs 2172, 2174, 2272 and 2274 each have a memory protecting function, and prevent each core in processor 216 from accessing a storage area not assigned to the core. Specifically, in MMUs 2272 and 2274, conversion table 600 shown in FIG. 4 is set during startup, and control device 200a utilizes this conversion table 600 to restrict access from standard cores 2262 and 2264 to safety storage area 2152.

In this manner, in conversion table 600 set in MMUs 2272 and 2274, access from standard cores 2262 and 2264 to the virtual address ranges for safety control is restricted, and therefore, access from standard cores 2262 and 2264 to the physical address ranges for safety control in RAM 215 (that is, safety storage area 2152) corresponding to the virtual address ranges is restricted. As a result, based on conversion table 600 that defines permission and prohibition of access to the physical address of RAM 215, access from standard cores 2262 and 2264 to safety storage area 2152 that stores the data involved with the safety control can be restricted.

c2. Second Example of Access Restricting Method in Control Device

Figure 10:
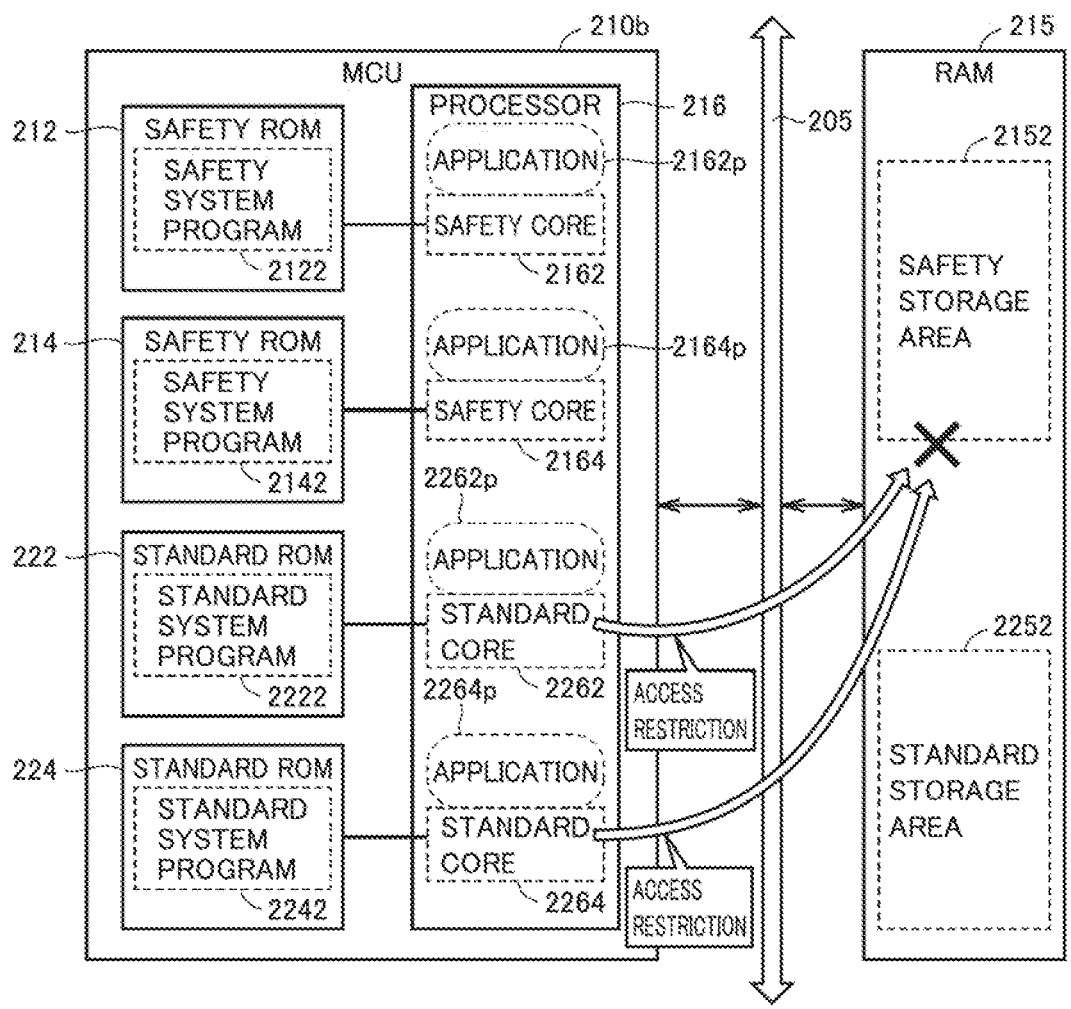
FIG. 10 is a schematic diagram for illustrating a second example of an access restricting method in the control device according to the second embodiment.

FIG. 10 is a schematic diagram for illustrating a second example of an access restricting method in a control device 200b according to the second embodiment. In an exemplary hardware configuration of control device 200b shown in FIG. 10, elements having the same configuration and function as those in the exemplary hardware configuration of control device 200 shown in FIG. 8 are designated by the same symbols and a description thereof will not be repeated. In addition, in the second example of the access restricting method in control device 200b according to the second embodiment shown in FIG. 10, a description of elements having the same configuration and function as those in the second example of the access restricting method in control device 100b according to the first embodiment shown in FIGS. 5 and 6 will not be repeated. Though a RAM is illustrated as one example of a "storage unit" also in the example of FIG. 10, as in the example shown in FIG. 6, not only a volatile memory such as a RAM but also a nonvolatile memory such as a ROM may be applied to the "storage unit," and any other storage medium including storage areas that store data involved with the safety control and data involved with the standard control may be applied.

As shown in FIG. 10, in an MCU 210b of control device 200b, access from standard cores 2262 and 2264 to safety storage area 2152 is restricted.

Specifically, in control device 200b, as shown in FIG. 6, as a mode indicative of a state of processor 216, a privileged mode and a user mode are provided for each of safety cores 2162, 2164 and standard cores 2262, 2264. In an access setting to RAM 215, too, a privileged mode and a user mode are specified for each of safety storage area 2152 and standard storage area 2252. The privileged mode is one example of a "first mode," and the user made is one example of a "second mode."

When each of safety core 2162, 2164 and standard cores 2262, 2264 is set to the user mode, and a prescribed instruction in applications 2162p, 2164p, 2262p and 2264p is executed, access to a storage area specified in the privileged mode is prohibited. In other words, access is more restricted when the user mode is set, than when the privileged mode is set.

When safety coms 2162 and 2164 access RAM 215 based on a prescribed instruction in applications 2162p and 2164p, safety cores 2162 and 2164 are able to access both safety storage area 2152 and standard storage area 2252 as shown in FIG. 6, whereas when standard cores 2262 and 2264 access RAM 215 based on the same prescribed instruction in applications 2262p and 2264p, standard cores 2262 and 2264 are able to access standard storage area 2252 but are restricted from accessing safety storage area 2152 as shown in FIG. 6.

In this manner, unlike when access is made by safety cores 2162 and 2164 based on a prescribed instruction, when access is made by standard cores 2262 and 2264 based on the same prescribed instruction, access from standard cores 2262 and 2264 to safety storage area 2152 that stores the data involved with the safety control can be restricted.

In addition, regardless of whether the mode that defines permission and prohibition of access to the storage areas of RAM 215 is the privileged mode, or the user mode that further restricts the access than the privileged mode, access from standard cores 2262 and 2264 to safety storage area 2152 that stores the data involved with the safety control can be restricted.

d2. Third Example of Access Restricting Method in Control Device

Figure 11:
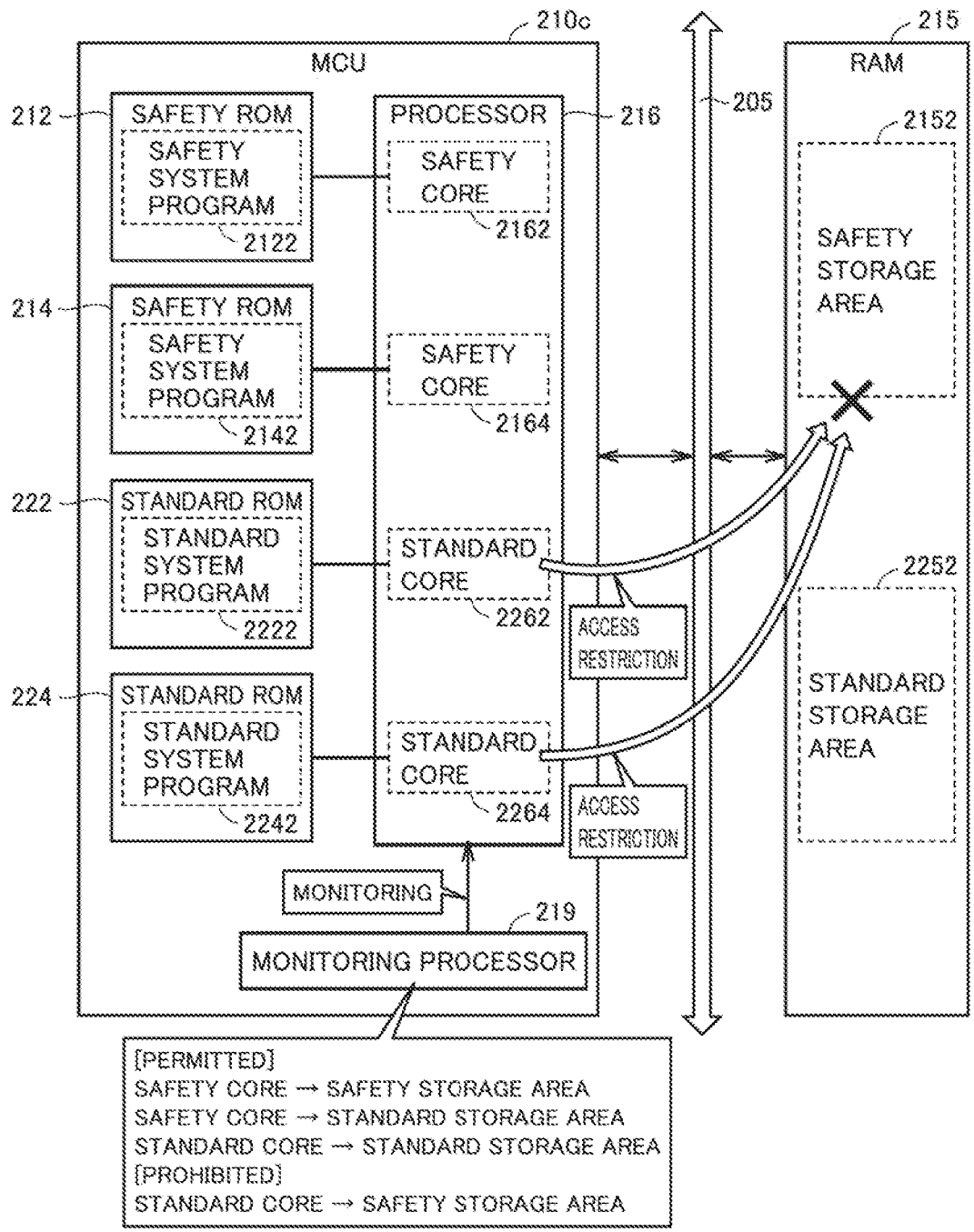
FIG. 11 is a schematic diagram for illustrating a third example of an access restricting method in the control device according to the second embodiment.

FIG. 11 is a schematic diagram for illustrating a third example of an access restricting method in a control device 200c according to the second embodiment. In an exemplary hardware configuration of control device 200c shown in FIG. 11, elements having the same configuration and function as those in the exemplary hardware configuration of control device 200 shown in FIG. 8 are designated by the same symbols and a description thereof will not be repeated. In addition, in the third example of the access restricting method in control device 200c according to the second embodiment shown in FIG. 11, a description of elements having the same configuration and function as those in the third example of the access restricting method in control device 100c according to the first embodiment shown in FIG. 7 will not be repeated.

As shown in FIG. 11, an MCU 210c of control device 200c includes a monitoring processor 219 connected to processor 216. Monitoring processor 219 is a coprocessor that assists processor 216, and is implemented by an FPGA, an ASIC, and the like. Monitoring processor 219 monitors access to the storage areas of RAM 215 from each of safety cores 2162, 2164 and standard cores 2262, 2264 included in processor 216. Monitoring processor 219 is not limited to one that is included in MCU 210c, and may monitor processor 216 of MCU 210c from outside of this MCU 210c.

Specifically, monitoring processor 219 permits access from safety cores 2162 and 2164 to safety storage area 2152, permits access from safety cores 2162 and 2164 to standard storage area 2252, permits access from standard cores 2262 and 2264 to standard storage area 2252, and prohibits access from standard cores 2262 and 2264 to safety storage area 2152. For example, when it is detected by monitoring processor 219 that standard cores 2262 and 2264 are trying to access safety storage area 2152, exception handling is performed to restrict the access from standard cores 2262 and 2264 to safety storage area 2152.

As a result, by monitoring processor 219 that monitors access from processor 216 to safety storage area 2152 and standard storage area 2252, access from standard cores 2262 and 2264 to safety storage ara 2152 can be restricted.

D. Additional Aspects

As described above, the present embodiment includes a disclosure as below.

[Configuration 1]

A control device (100, 200) that controls a drive device (430), the control device comprising:

a first operating unit (101) configured to perform safety control for the drive device;

a second operating unit (102) configured to perform standard control for the drive device; and a storage unit (103) accessible by both the first operating unit and the second operating unit, the storage unit including a first storage area (1031) and a second storage area (1032), the first storage area storing data involved with the safety control, the second storage area storing data involved with the standard control, wherein the first operating unit is configured to access both the first storage area and the second storage area, whereas the second operating unit is configured to access the second storage area but is configured to be restricted from accessing the first storage area.

[Configuration 2]

The control device (100) according to configuration 1, comprising a plurality of microcontroller units (MCUs) (110, 120) wherein the first operating unit is a processor core (1162, 1262) configured to perform the safety control, the second operating unit is a processor core (1164) configured to perform the standard control, each of the plurality of microcontroller units includes the processor core (116) configured to perform the safety control, and at least one of the plurality of microcontroller units includes the processor core (1164, 1264) configured to perform the standard control.

Configuration 3

The control device (100) according to configuration 2, wherein mutual monitoring is performed between the processor cores configured to perform the safety control included respectively in the plurality of microcontroller units.

[Configuration 4]

The control device (200) according to configuration 1, comprising a microcontroller unit (MCU)(210), wherein the first operating unit is a processor core (2162, 2164) configured to perform the safety control, the second operating unit is a processor core (2262, 2264) configured to perform the standard control, and the microcontroller unit includes a plurality of processor cores configured to perform the safety control, and at least one or more processor cores configured to perform the standard control.

[Configuration 5]

The control device (100*a*, 200*a*) according to any one of configurations 1 to 4, comprising a data table (600) that defines permission and prohibition of access to memory addresses of the storage unit, wherein based on the data table, the first operating unit is configured to access both a memory address of the first storage area and a memory address of the second storage area, whereas the second operating unit is configured to access the memory address of the second storage area but is configured to be restricted from accessing the memory address of the first storage area.

[Configuration 6]

The control device (100*b*, 200*b*) according to any one of configurations 1 to 4, wherein based on a prescribed instruction, the first operating unit is configured to access both the first storage area and the second storage area, whereas based on the prescribed instruction, the second operating unit is configured to access the second storage area but is configured to be restricted from accessing the first storage area.

[Configuration 7]

The control device (100*b*, 200*b*) according to configuration 6, wherein a first mode and a second mode are provided as a mode that defines permission and prohibition of access to the storage unit, the second mode further restricting the access than the first mode, and the second operating unit is configured to be restricted from accessing the first storage area regardless of whether the mode is the first mode or the second mode.

[Configuration 8]

The control device (100*c*, 200*c*) according to any one of configurations 1 to 4, wherein the first operating unit is a processor core (1162, 1262, 2162, 2164) configured to perform the safety control, the second operating unit is a processor core (1164, 1264, 2164, 2264) configured to perform the standard control, the control device further comprises a monitoring processor (119, 129, 219), as a coprocessor configured to assist a processor (116, 126, 216) including the processor core configured to perform the standard control and the processor core configured to perform the safety control, the monitoring processor monitoring access from the processor to the first storage area and the second storage area, and the second operating unit is configured to be restricted from accessing the first storage area by the monitoring processor.

E. Advantages

According to control device 100 of the present embodiment, even when first operating unit 101 configured to perform the safety control and second operating unit 102 configured to perform the standard control coexist, second operating unit 102 is configured to be restricted from accessing first storage area 1031 involved with the safety control, and therefore, safety can be ensured without the safety control being affected by second operating unit 102 configured to perform the standard control.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

100, 100*a*, 100*b*, 100*c*, 200, 200*a*, 200*b*, 200*c* control device; 101 first operating unit; 102 second operating unit;

103 storage unit; 1051, 1052, 205 processor bus; 110, 120, 110a, 120a, 110b, 120b, 110c, 120c, 210 MCU; 112, 122, 212, 214 safety ROM; 114, 124, 222, 224 standard ROM; 115, 125, 215 RAM; 116, 126, 216 processor; 119, 129, 219 monitoring processor; 130, 230 storage; 132, 232 safety program; 134, 234 standard program; 140, 240 USB controller; 150, 250 memory card interface; 160, 260 local bus interface; 300 safety device; 410 safety relay; 420 driver; 430 drive device; 500 support device; 600 conversion table; 1031 first storage area; 1032 second storage area; 1053 bridge; 1122, 1222, 2122, 2142 safety system program; 1142, 1242, 2222, 2242 standard system program; 1144 restriction data; 1152, 1252, 2152 safety storage area; 1154, 1254, 2252 standard storage area; 1162, 1262, 2162, 2164 safety core; 1162p, 1164p, 1262p, 1264p, 2162p, 2164p, 2262p, 2264p application; 1164, 1264, 2262, 2264 standard core; 2172, 2174, 2272, 2274 MMU.

The invention claimed is:

1. A control device that controls a drive device, the control device comprising:
   a first operating unit configured to perform safety control for the drive device;
   a second operating unit configured to perform standard control for the drive device;
   a storage unit accessible by both the first operating unit and the second operating unit, the storage unit including a first storage area and a second storage area, the first storage area storing data involved with the safety control, the second storage area storing data involved with the standard control; and
   a plurality of microcontroller units,
   wherein:
      the first operating unit is configured to access both the first storage area and the second storage area,
      the second operating unit is configured to access the second storage area but is configured to be restricted from accessing the first storage area,
      the first operating unit is a processor core configured to perform the safety control,
      the second operating unit is a processor core configured to perform the standard control,
      each of the plurality of microcontroller units includes the processor core configured to perform the safety control,
      at least one of the plurality of microcontroller units includes the processor core configured to perform the standard control, and
      mutual monitoring is performed between the processor cores configured to perform the safety control included respectively in the plurality of microcontroller units.

2. The control device according to claim 1, further comprising a data table that defines permission and prohibition of access to memory addresses of the storage unit, wherein
   based on the data table, the first operating unit is configured to access both a memory address of the first storage area and a memory address of the second storage area, whereas
   the second operating unit is configured to access the memory address of the second storage area but is configured to be restricted from accessing the memory address of the first storage area.

3. The control device according to claim 1, wherein:
   based on a prescribed instruction, the first operating unit is configured to access both the first storage area and the second storage area, whereas
   based on the prescribed instruction, the second operating unit is configured to access the second storage area but is configured to be restricted from accessing the first storage area.

4. The control device according to claim 3, wherein:
   a first mode and a second mode are provided as a mode that defines permission and prohibition of access to the storage unit, the second mode further restricting the access than the first mode, and
   the second operating unit is configured to be restricted from accessing the first storage area regardless of whether the mode is the first mode or the second mode.

5. The control device according to claim 1, wherein:
   the first operating unit is a processor core configured to perform the safety control,
   the second operating unit is a processor core configured to perform the standard control,
   the control device further comprises a monitoring processor, as a coprocessor configured to assist a processor including the processor core configured to perform the standard control and the processor core configured to perform the safety control, the monitoring processor monitoring access from the processor to the first storage area and the second storage area, and
   the second operating unit is configured to be restricted from accessing the first storage area by the monitoring processor.

* * * * *